Dec. 2, 1958 H. C. MacDOUGALL 2,862,534
COCONUT PARING MACHINE HAVING OVERLAPPING DISK KNIVES
Filed Feb. 23, 1955 4 Sheets-Sheet 1

INVENTOR
Hugh C. MacDougall.
BY Cameron, Kerkam & Sutton
ATTORNEYS

Dec. 2, 1958  H. C. MacDOUGALL  2,862,534
COCONUT PARING MACHINE HAVING OVERLAPPING DISK KNIVES
Filed Feb. 23, 1955  4 Sheets-Sheet 2

INVENTOR
Hugh C. MacDougall
BY
Cameron, Kerkam & Sutton
ATTORNEYS

INVENTOR
Hugh C. MacDougall.
BY Cameron, Kerkam + Sutton
ATTORNEYS 2,862,534

COCONUT PARING MACHINE HAVING OVERLAPPING DISK KNIVES

Hugh C. MacDougall, Palisades Park, N. J.

Application February 23, 1955, Serial No. 489,846

8 Claims. (Cl. 146—7)

This invention relates to paring machines and more particularly to such machines designed to remove the skin from edible articles of relatively rigid nature such as coconuts or the like.

Even more particularly this invention relates to paring machines for coconuts in which the coconut is moved to a first paring station where a portion of the skin is peeled from the nut and is then moved to a second paring station where the remainder of the skin is removed from the nut, the nut then moving to a third station where the unpared ends of the nut are removed and the nut is discharged in completely pared condition.

Heretofore various machines have been proposed for paring edible objects such as coconuts. The present invention has for its general object an improvement over such prior art machines in which the nuts are quickly and efficiently pared in a machine of relatively simple construction which by reason of the movement of the nuts from station to station increases the speed of paring of the nuts.

It is another object of this invention to provide novel paring devices for the removal of the skin of edible objects for use in the apparatus of the present invention.

Within the general definition of the invention as given above the present invention is capable of various mechanical embodiments one of which is shown in the accompanying drawings and is described hereinafter, to illustrate the invention. This illustrative embodiment of the invention should not be construed as defining or limiting the same and reference should be had to the appended claims for these purposes.

In the accompanying drawings, in which like reference characters indicated like parts, Fig. 1 is an end view of an illustrative embodiment of the paring machine of the present invention with the end framing removed to show the relative position of the several parts thereof and with the drive for the central shaft in broken lines;

Figure 1:
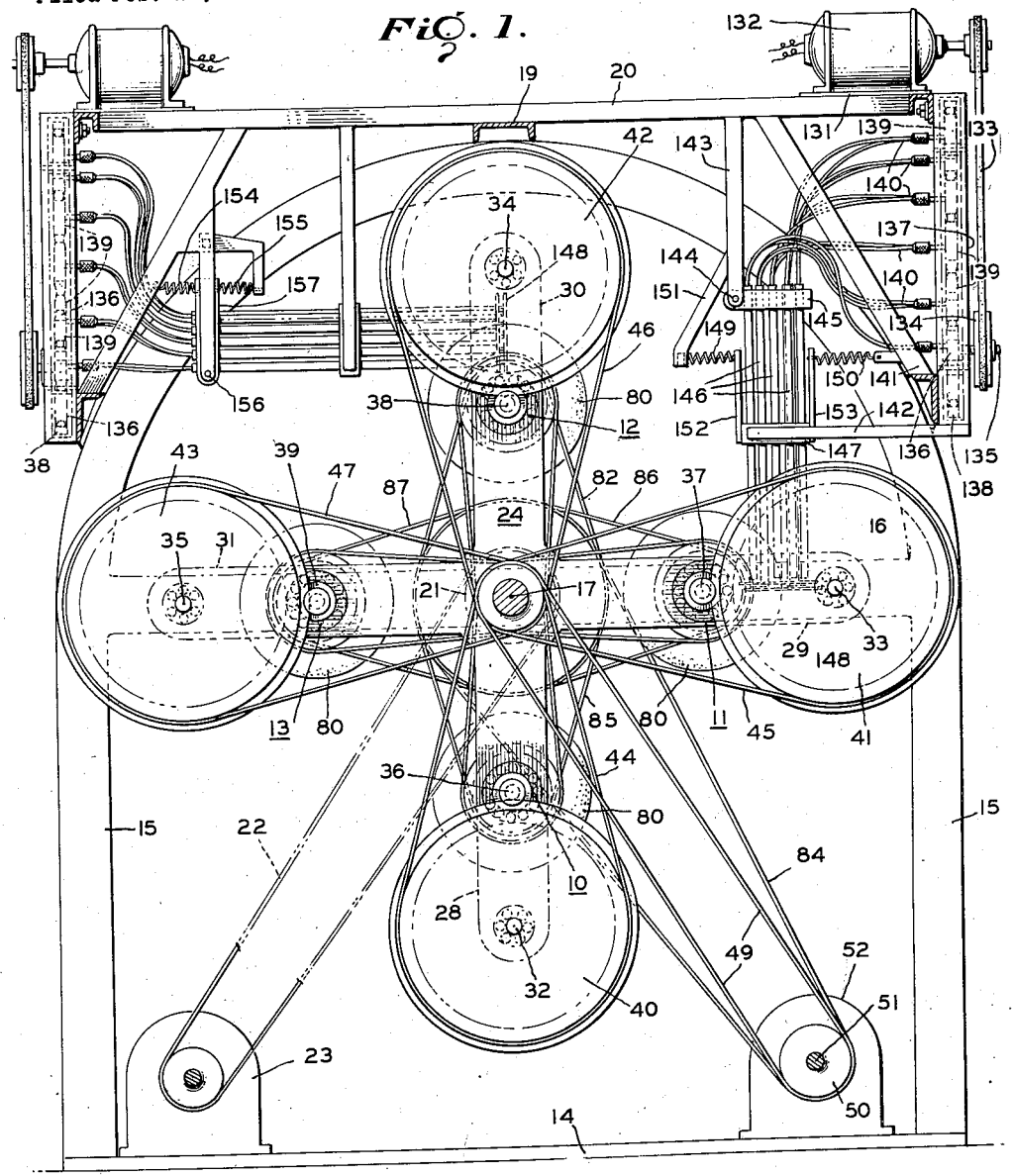
Fig. 1a is a view of a portion of the drive for the paring knives.

Before considering the detailed construction of this illustrative embodiment of the present invention it should be understood that the object to be pared hereinafter referred to as a coconut is supplied to the machine at a loading station generally indicated at 10 in Fig. 1 where it is supported between cam actuated plungers. The coconut, while held between the plungers, is then moved to the first paring station generally indicated at 11 where the coconut is rotated about its long axis while, at the same time, coming into contact with a plurality of overlapping circular rotary knives which remove a portion of the skin from the coconut. The coconut is then moved to the second paring station generally indicated at 12 where the rotating coconut is engaged by a second set of overlapping circular rotary knives which remove the skin from the coconut not removed at the first paring station. When paring is completed at the second paring station the coconut is moved to a discharge station generally indicated at 13 where cam actuated knives are moved into contact with the ends of the coconut to remove the unpared ends and to allow the milk to flow from the coconut. After the ends are removed the pared coconut is either manually or mechanically conveyed from the machine which then returns the now empty plungers back to the loading station 10. When the machine is in normal operation there will be a coconut at each of the aforesaid four stations and coconuts to be pared move through the machine in a continuous sequence.

As noted above, the rotary overlapping circular paring knives and their arrangement at the first and second paring stations comprise an important part of the present invention. These knives and their construction will be described in more detail hereinafter but, in brief, it should be noted that each knife comprises a circumferentially toothed disc which overlaps adjacent knives, all of the knives being arranged so that their centers of rotation lie in an arc which approximates the half profile of the coconuts to be pared. Each knife is rotated at high speed through its own individual drive a part of which comprises a rigid tube mounted in suitable spring balanced framework so that as the coconut is moved to the paring station the knives will be slightly displaced by the rotating coconut to perform their paring action.

Two paring stations are usually sufficient to completely pare a coconut or like edible object but it is within the purview of this invention to include as many paring stations as may be required and the present invention is not limited to the use of two paring stations as shown in the illustrative embodiment thereof and as described hereinafter.

In a machine having a loading station, two paring stations and an end cutting and discharging station four sets of coconut supporting plungers and associated operating devices may be used. Thus each set of plungers and associated operating devices is spaced at an angle of 90° from the next set and the four sets of plungers and associated operating devices are mounted for unitary intermittent rotation about a central axis. To this end the drive shaft of the machine may be driven step by step by any suitable means and controlled in any suitable manner as by the use of a drive of the well known Geneva-type or even by hand. Likewise the rotating devices, plungers, and other elements of each set can be operated by any suitable mechanism which per se forms no part of the present invention.

Each set of mechanisms comprises coconut supporting plungers, cam mechanism for moving the same, end cutting knives and cam mechanism for moving the same, mechanism for rotating the coconut about its long axis, and mechanism for rotating the end cutting knives. The arrangement and operation of each set is the same for each of the four stations of the machine and so will be described hereinafter in detail with respect to but one of them, and with particular reference to its operation at the second paring station.

Referring now more particularly to Fig. 1 the machine of the present invention is provided with a suitable bed 14 upon which suitable end framing 15 is mounted. End framing 15 is provided with horizontal framing 16 in which central shaft 17 is mounted for rotation in suitable bearings 18. A top frame 19 extends between end frames 15 and carries a frame generally indicated at 20 supporting the paring knives at the first and second paring stations.

Shaft 17 carries pulley 21 which is driven by belt 22 which in turn is driven by a suitable power device 23. As stated above, this drive rotates shaft 17 in an intermittent stepwise manner together with the four sets of mechanisms as will be more fully understood hereinafter.

Figure 2:
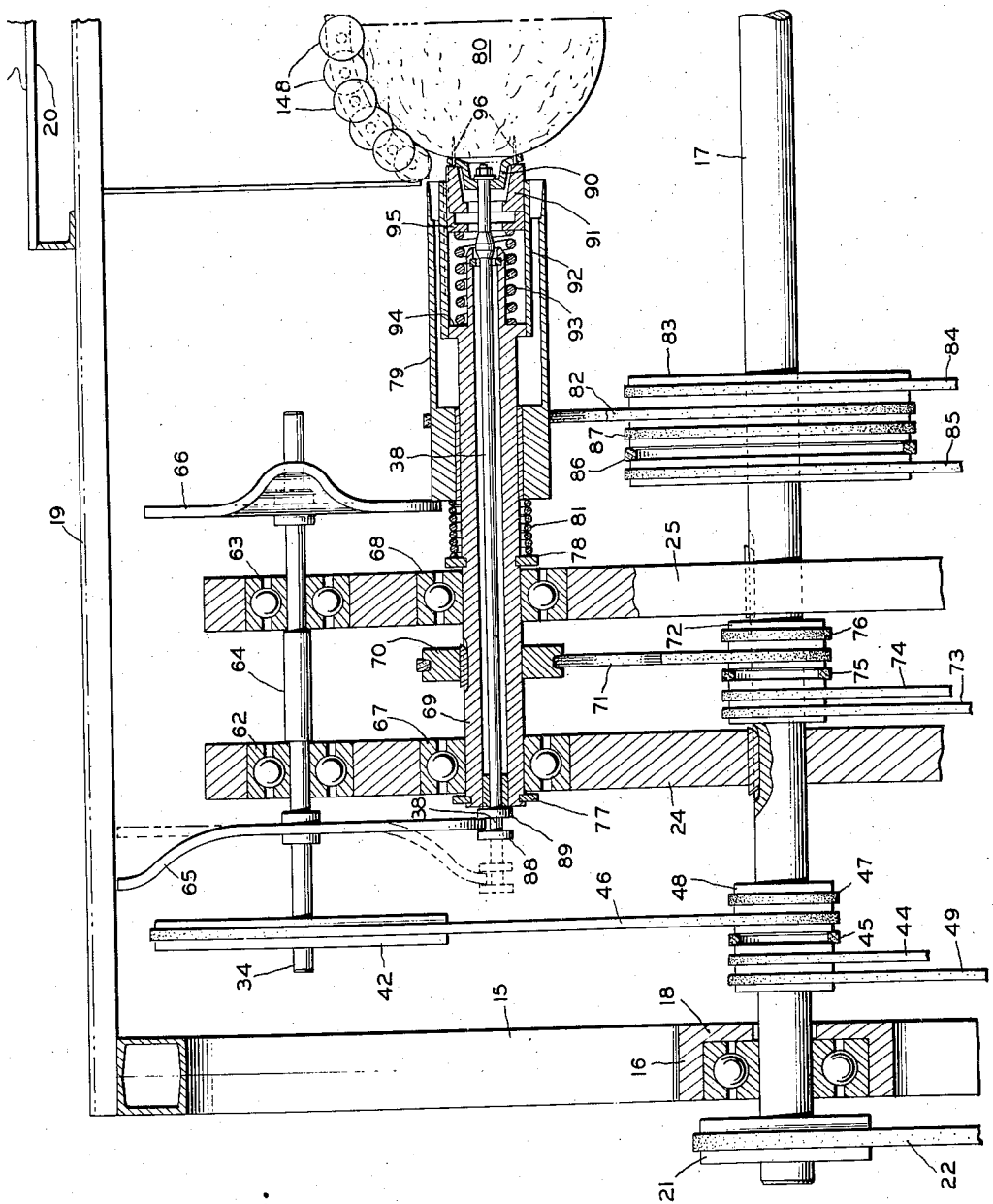
Fig. 2 is an enlarged view partly in section of the mechanism at the second paring station showing in detail the overlapping rotary cutters for paring the edible object.
Figure 2A:
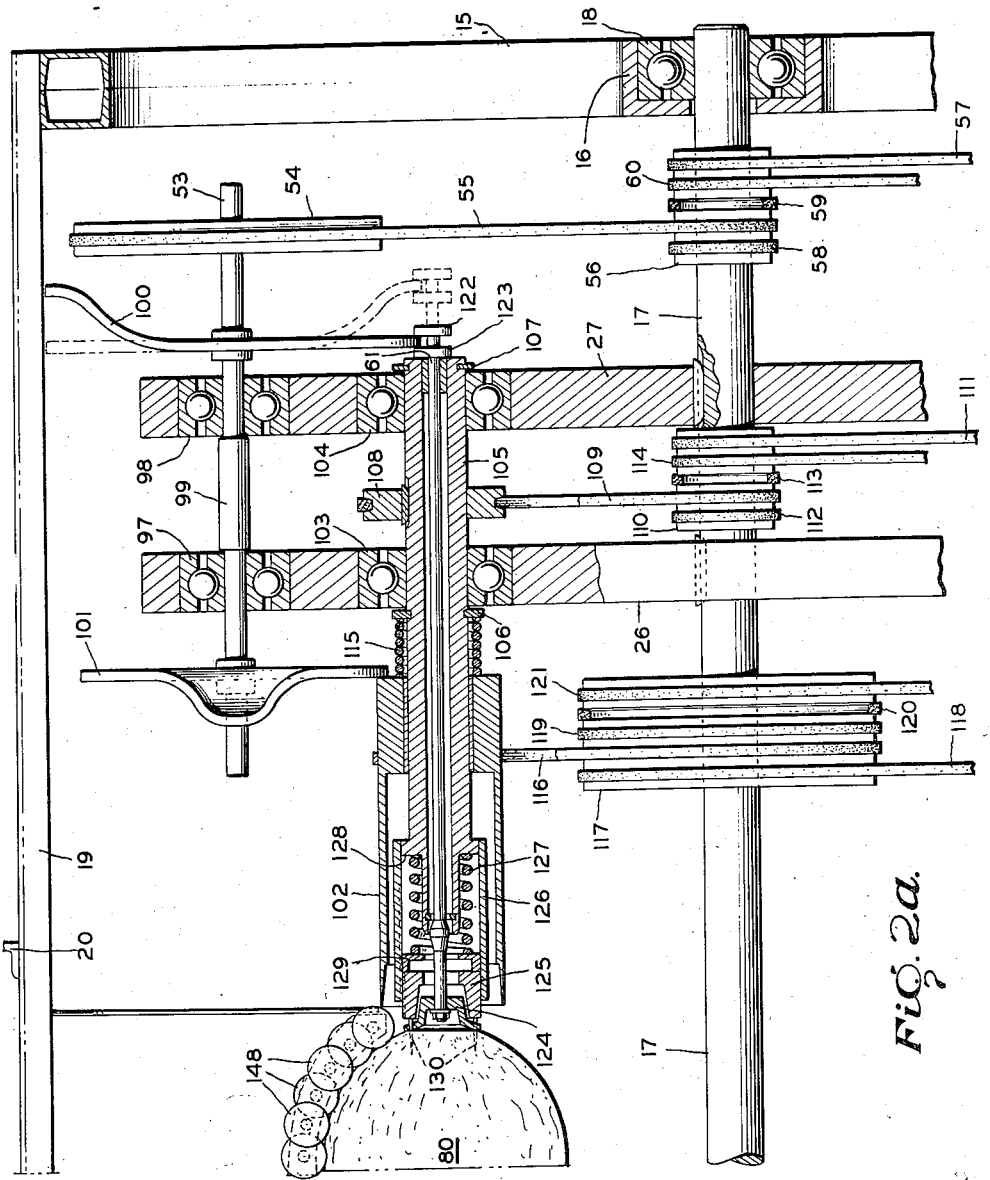
Fig. 2a is a continuation of the showing of Fig. 2.

Spaced parallel frames 24 and 25 are keyed to shaft 17 adjacent one end thereof (Fig. 2) and similar spaced parallel frames 26 and 27 are keyed to shaft 17 adjacent the other end thereof (Fig. 2a). Each of frames 24, 25, 26 and 27 comprises four arms shown at 28, 29, 30 and 31 for frame 24, each arm being at a 90° angle to the next arm. Each oppositely disposed pair of these arms supports for rotation a cam shaft and a plunger-supporting actuating shaft and assembly extending parallel to central shaft 17. The cam shafts are shown at 32, 33, 34 and 35 and the plunger shafts are shown at 36, 37, 38 and 39 for frames 24 and 25. Cam shafts 32, 33, 34 and 35 are rotated by suitable pulleys secured thereto, respectively, and indicated at 40, 41, 42 and 43. Pulleys 40, 41, 42 and 43 are rotated by belts 44, 45, 46 and 47, respectively, each of these belts embracing a suitable pulley 48 (Fig. 2) which is mounted for free rotation on shaft 17 and is in turn rotated by belt 49 which leads to a suitable pulley 50 on common drive shaft 51, drive shaft 51 being driven by a suitable motor 52.

Each of oppositely disposed parallel frames 26 and 27 is also provided with four extending arms similar to those described above for frames 24 and 25 and each of the arms of frames 26 and 27 carry identical structure to that described above for the arms of frames 24 and 25. One such cam shaft 53 is shown in Fig. 2a. Shaft 53 is rotated by pulley 54 secured thereto which in turn is driven by belt 55 driven by a suitable pulley 56 mounted for free rotation on central shaft 17. Pulley 56 is driven by belt 57 which is driven by a suitable pulley similar to pulley 50 on common drive shaft 51. Belts 58, 59 and 60 extend from pulley 56 to the other pulleys on the cam shafts carried by the other arms of frames 26 and 27. Each spaced pair of arms of frames 26 and 27 is aligned with the corresponding pair of arms of frames 24 and 25.

As noted above, each pair of parallel arms of frames 24 and 25 supports a coconut supporting plunger and end cutting apparatus, these mechanisms including the central shafts 36, 37, 38 and 39 mentioned above, and the pairs of arms of frames 26 and 27 carry similar plungers, end cutting apparatus, and shafts, one of which is shown in Fig. 2a at 61. Thus each cam shaft and plunger shaft carried by frames 24 and 25 has a counterpart aligned cam shaft and plunger shaft carried by frames 26 and 27. Frames 24 and 25 are spaced with respect to frames 26 and 27 and the plunger assemblies are so arranged that a coconut may be supported at the ends of its long axis between oppositely disposed plungers for rotation and for movement from station to station in the machine in a manner to be hereinafter described.

Referring now more particularly to Fig. 2, cam shaft 34 is there seen to be mounted in bearings 62 and 63 carried by frames 24 and 25, respectively, and is prevented from axial movement by a sleeve 64 secured thereto between the bearings. Cam shaft 34 carries a suitable cam 65 to actuate the plunger assembly and a second suitable cam 66 to actuate the end cutting knives when the discharge station is reached. Frames 24 and 25 also support bearings 67 and 68 in which plunger housing 69 is mounted for rotation. Plunger housing 69 extends parallel to cam shaft 34 and to main shaft 17 and is rotated by a pulley 70 suitably keyed thereto.

Pulley 70 is driven by belt 71 which passes around pulley 72 which in turn is mounted for free rotation on shaft 17. Pulley 72 is rotated by belt 73 which is driven by a suitable pulley on common drive shaft 51. Belts 74, 75 and 76 rotate the other plunger housings surrounding shafts 36, 37 and 39. Housing 69 is prevented from axial movement in bearings 67 and 68 by suitable split rings 77 and 78.

A tubular end cutting knife 79 is mounted for rotation on housing 69 and is urged into cutting engagement with the coconut shown at 80 by cam 66, tension spring 81 holding knife 79 against cam 66. Knife 79 is rotated by belt 82 which is driven by a suitable pulley 83 mounted for free rotation on shaft 17 and pulley 83 is driven by belt 84 which in turn is driven by a suitable pulley on common drive shaft 51. Belts 85, 86 and 87 rotate the end cutting knives on the plunger housings on shafts 36, 37 and 39 respectively.

Shaft 38 is moved axially by cam 65 acting in cam collars 88 and 89 and carries an expanded head 90 secured at its other extremity. Head 90 engages tubular spike support 91 which slides in cylindrical extension 92 of housing 69 against the pressure of spring 93 which engages shoulder 94 and ring 95. Support 91 carries a plurality of spikes 96 which pass through suitable holes in head 90 and engage the end portions of the coconut. Cam 65 is so shaped that the coconut 80 will be supported and rotated by spikes 96 at the loading station and through the paring stations to the discharge station and through the operation of the end cutting knives 79. The diameter of pulley 83 is selected with due regard for the diameter of pulley 72, of pulley 70 and of knife 79 so that knife 79 will at all times rotate at speeds greater than the speed of rotation of the coconut 80 to effect the cutting of the ends of the coconut when the end cutting and discharge station is reached.

Frames 26 and 27 carry structures at the extremities of each of their four extending arms similar to that described above for Fig. 2 and the counterpart of the structure of Fig. 2 lying oppositely thereto and supporting the other side of the coconut 80 is shown in Fig. 2a. Cam shaft 53 is mounted in bearings 97 and 98 and is prevented from axial movement by sleeve 99 suitably secured thereto. Cam shaft 53 carries cams 100 and 101, cam 100 axially moving shaft 61 and cam 101 moving end cutting knife 102 into engagement with the end of coconut 80 at the end cutting and discharge station. Frames 26 and 27 also carry aligned bearings 103 and 104 in which plunger housing 105 is mounted for rotation. Housing 105 is prevented from axial movement by suitable split rings 106 and 107 and is rotated by a suitable pulley 108 keyed thereto and driven by belt 109 which in turn is driven by pulley 110 mounted for free rotation on shaft 17. Pulley 110 is driven by belt 111 which in turn is driven by a suitable pulley mounted on common drive shaft 51. Belts 112, 113 and 114 drive the other plunger housings mounted in the other arms of frames 26 and 27.

Circular end cutting knife 102 is mounted for rotation on housing 105 and for axial movement thereon by the action of cam 101, tension spring 115 holding knife 102 against cam 101. Knife 102 is rotated at higher speeds than coconut 80 by belt 116 which is driven by pulley 117, pulley 117 being the counterpart of pulley 83. Pulley 117 is driven by belt 118 which in turn is driven by a suitable pulley on common drive shaft 51. Belts 119, 120 and 121 drive the corresponding cylindrical knives at the other extremities of the extending arms of frames 26 and 27.

Cam 100 moves shaft 61 axially by engagement with cam shoulders 122 and 123 and shaft 61 carries on its other extremity an expanded head 124 which engages spike support 125. Spike support 125 moves axially in extension 126 of housing 105 and is urged outwardly therefrom by spring 127 which abuts shoulder 128 and ring 129. Support 125 carries spikes 130 which engage the adjacent end of coconut 80 and holds coconut 80 for rotation about its axis and for movement through the paring stations and until the end cutting and discharge station is reached at which time spikes 130 are disengaged from the cut end of the coconut.

As was pointed out above, the embodiment of the present invention herein described includes two paring stations at each of which is arranged a plurality of overlapping circular rotating knives, the centers of which are disposed and supported in an arc approximately the half curve or profile of the coconut to be pared. The knives at each station are held in a frame which is pivoted and countersupported so as to resiliently engage the coconut when the same is presented to the knives to effect a paring thereof to the desired depth. At the first paring station the frame extends vertically with the knives lying in a more or less horizontal plane, while at the second paring station the knife frame extends in a more or less horizontal plane and the knives lie in a more or less vertical plane. At both paring stations in the present embodiment the knife frame is spring supported in both directions for limited rotation about the pivot to control the depth of the cut by the knives.

Figure 3:
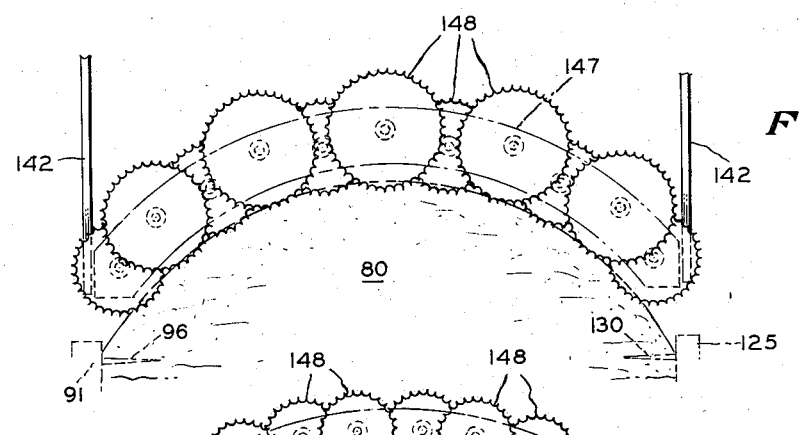
Fig. 3 is an enlarged end view of the cutter arrangement at the first paring station.
Figure 4:
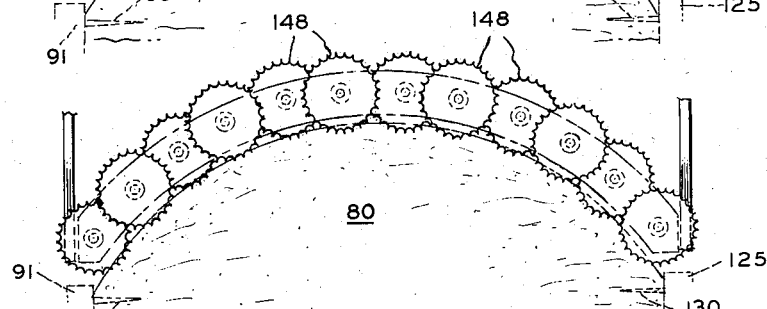
Fig. 4 is an enlarged end view of the cutter arrangement at the second paring station.
Figure 5:
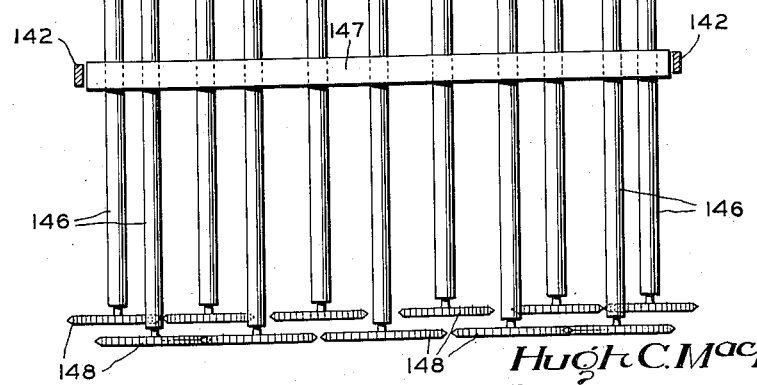
Fig. 5 is an enlarged view from above of a typical arrangement of the rotary cutters used at the paring stations.

When using overlapping rotary circular knives having circumferentially toothed cutting edges it is impossible to so overlap the knives that all of the coconut can be pared at one station. Rings of skin will be left about the coconut and these rings must be removed by the arrangement of the overlapping knives at the second or subsequent paring station. A suitable arrangement of these knives to completely pare a coconut is shown in Figs. 3 and 4 where any skin left by the knives in the arrangement of Fig. 3 will be removed by the arrangement of the knives of Fig. 4.

Figure 1A:
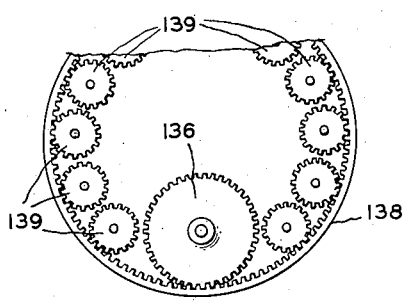

Frame 20, as noted above, carries the paring knives and associated structure for each of the paring stations and includes a suitable platform 131 for electric motor 132 which drives belt 133 to rotate pulley 134 which in turn rotates shaft 135 and gear 136 which is mounted thereon within a suitable housing 137. An internally toothed ring gear 138 (Fig. 1a) is mounted for rotation in housing 137 and is driven by gear 136. Engaging ring gear 138 within housing 137 are a plurality of small gears 139 equal in number to the number of circular knives employed at the first cutting station and gears 139 are connected to suitable flexible drive cables 140 there being one such cable 140 for each of the circular knives.

Housing 137 is held by a suitable brace 141 and carries guides 142 whose function will be described hereinafter. Arms 143 extend downwardly from frame 20 and pivotally support at 144 an arcuate shaped frame 145 in which are mounted a plurality of tubes 146 corresponding in number to the number of rotary knives employed. Tubes 146 are additionally supported by a second arcuate frame 147 which is mounted for sliding movement between guides 142. Each of flexible drive cables 140 connects to one of the tubes 146 and the drive element thereof continues therethrough. A circular knife 148 is mounted at the other extremity of each of the tubes 146 and is rotated by the drive cable 140 extending therethrough. The knife frame hung on pivot 144 is spring loaded for controlled movement and to provide the desired depth of paring cut by springs 149 and 150, spring 149 being secured at one end to frame extension 151 and at the other end to extension 152 of frame 147 while spring 150 is secured at one end to brace 141 and at the other end to extension 153 of frame 147.

The mechanism for driving the cutters at the second paring station is in every way similar to that described above for the first paring station, it being remembered that the rotary paring knives at the second paring station are so disposed as to remove the skin not removed at the first paring station. At the second paring station springs 154 and 155 counterbalance the weight of the knife frame about the pivot 156 and engage the arc-shaped frame member 157 corresponding to the above described frame member 145.

The operation of the embodiment of the novel paring machine of the present invention should now be apparent. The coconut to be pared is received at loading station 10 between the opposed pair of cam actuated plungers and is rotated about its long axis. From loading station 10 the rotating coconut is moved to the first paring station 11 and pauses there, by reason of the step-by-step drive of shaft 17, during paring by the knives 148. These knives and their associated frame tend to occupy a normal position about pivot 144 in which springs 149 and 150 are counterbalanced. This position is such that the arc-shaped cutting head will be engaged even by a small coconut as it moves into paring position under the knives, and will be displaced to the left as seen in Fig. 1, swinging about pivot 144. The depth of paring cut will depend mainly on the spring tension which can be selected as desired.

When paring is completed at station 11 the Geneva mechanism 23 moves the coconut to the second paring station 12 and stops the coconut there for further paring. The knives at the second paring station are displaceable about their pivot 156 under the control of springs 154 and 155 by the coconut in the same manner as the knives at the first paring station and the spring tension controls the depth of cut of the knives.

When paring is completed at the second paring station driving mechanism 23 moves the coconut to end cutting and discharge station 13 where the cylindrical end knives are cam actuated to cut the unpared ends from the coconut, the plungers are withdrawn by their cams and the pared nut is removed from the machine.

It should now be apparent that by the present invention there has been provided a novel paring machine which in every way satisfies the several objectives described above. Changes in or modifications to the above described illustrative embodiment of this invention may now occur to those skilled in the art without departing from the present inventive concept and reference should therefore be had to the appended claims to determine the scope of this invention.

What is claimed is:

1. A paring machine for commodities shaped similarly to a coconut comprising a commodity holding device for moving a commodity past a paring station while rotating the commodity on its own axis, and paring means at said station comprising a set of circumferentially toothed disk knives overlapping one another circumferentially with their centers disposed in an arc approximating the half profile of the commodity, said set of knives being disposed in planes substantially parallel to the axis of rotation of the commodity and being resiliently mounted as a unit for yielding movement in a direction substantially at right angles to said axis of rotation.

2. In a paring machine for edible commodities, a frame, a second frame mounted for rotation in said first frame, a plurality of stations on said second frame each station including a pair of axially disposed reciprocal and rotatable plungers for holding the commodity, a cylindrical knife rotatably and reciprocally mounted on each of said plungers, cam means rotatably mounted on said second frame for reciprocating said plungers and knives, a common drive means drivingly connected with and rotating said plungers, knives and cam means, paring means pivoted on said first frame for engagement with the commodities at more than one of said stations each of said paring means including a set of overlapping rotating circular knives having their centers in an arc approximating the half profile of the commodity, and means for counterbalancing each set of knives about its pivot for yielding engagement with the surface of the commodity as it is carried past the paring means by rotation of said second frame, said cams for said plungers holding said plungers in engagement with the commodity as the commodity passes said paring means, and said cams for said cylindrical knives moving said knives into cutting engagement with the ends of the commodity after said paring means have been passed by the commodity.

3. In a paring machine for edible commodities, a frame, a second frame mounted for rotation in said first frame, four stations on said second frame each of said stations including a pair of axially disposed rotatable and reciprocal plungers for holding the commodity, a cylindrical knife rotatably and reciprocally mounted on each of said plungers, cam means rotatably mounted on said second frame for reciprocating said plungers and said knives, a common drive means drivingly connected with and rotating said plungers, knives and cam means, first paring means pivoted on said first frame for engagement with the commodity at one of said stations, second paring means pivoted on said frame for engagement with the commodity at another of said stations, each of said paring means including a set of overlapping rotating circular knives having their centers in an arc approximating the half profile of the commodity, and means for counterbalancing each set of knives about its pivot for yielding engagement with the surface of the commodity as it is carried past the paring means by the rotation of said second frame, said cams for said plungers moving said plungers into engagement with the commodity before the paring stations and said cams for said cylindrical knives moving said cylindrical knives into cutting engagement with the commodity after the paring stations.

4. A paring machine as described in claim 3 in which the overlapping rotatable circular knives at said second paring station are arranged to pare the unpared portions of the commodity left by said first paring station.

5. In a paring machine, a frame, a second frame mounted in said first frame for rotation through a loading station, at least two paring stations, and a discharge station, said second frame having a plurality of commodity holding and rotating means, paring means at each of said paring stations, each of said paring means including a frame pivoted on said first frame, a plurality of overlapping rotatable circular knives mounted on said pivoted frame and disposed with their centers in an arc approximating the half profile of the commodity, and counterbalancing means between said pivoted frame and said first frame providing yielding engagement of said knives with the surface of the commodity as it is carried past the knives by the rotation of said second frame, said commodity holding means receiving the commodity at said loading station and rotating the commodity while moving it past said paring stations and to said discharge station.

6. A paring machine as described in claim 5 in which said overlapping rotatable circular knives at said paring stations subsequent to said first paring station are arranged to pare the unpared portions of the commodity left by the preceding paring stations.

7. In a paring machine in which the commodity is moved from a loading station to at least two paring stations and to a discharge station, means for receiving the commodity at said loading station and for rotating the commodity on its own axis while moving it through said other stations, paring means at each of said paring stations, each of said paring means including a pivoted counterbalanced frame, a plurality of overlapping rotatable circular knives mounted on said frame and disposed with their centers in an arc approximating the half profile of the commodity, said knives being resiliently mounted as a unit for yielding engagement with the surface of a commodity moving through said paring stations and means for rotating said circular knives.

8. A paring machine as described in claim 7 in which said overlapping rotatable circular knives at said paring stations subsequent to said first paring station are arranged to pare the unpared portions of the commodity left by the preceding paring stations.

References Cited in the file of this patent

UNITED STATES PATENTS

| | | |
|---|---|---|
| 1,116,880 | Giampietro | Nov. 10, 1914 |
| 1,860,746 | MacDougall | May 31, 1932 |
| 1,951,804 | MacDougall | Mar. 20, 1934 |
| 2,365,358 | Rector | Dec. 19, 1944 |

UNITED STATES PATENT OFFICE
CERTIFICATE OF CORRECTION

Patent No. 2,862,534

December 2, 1958

Hugh C. MacDougall

It is hereby certified that error appears in the printed specification of the above numbered patent requiring correction and that the said Letters Patent should read as corrected below.

Column 5, line 11, for "approximately" read -- approximating --;

column 6, line 52, after "toothed" insert -- rotatable --.

Signed and sealed this 21st day of April 1959.

(SEAL)
Attest:

KARL H. AXLINE
Attesting Officer

ROBERT C. WATSON
Commissioner of Patents